(12) United States Patent
Morosawa et al.

(10) Patent No.: US 11,440,506 B2
(45) Date of Patent: Sep. 13, 2022

(54) ENTRY SUPPORT SYSTEM, ENTRY SUPPORT METHOD, AND STORAGE MEDIUM

(71) Applicant: HONDA MOTOR CO., LTD., Tokyo (JP)

(72) Inventors: Ryo Morosawa, Tokyo (JP); Haisong Liu, Tokyo (JP); Akira Nakajima, Tokyo (JP); Kenji Okuma, Tokyo (JP); Hiroaki Maruyama, Tokyo (JP); Yoshikazu Matsuo, Tokyo (JP); Shuto Higashi, Tokyo (JP); Fumiaki Yamaguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/329,491

(22) Filed: May 25, 2021

(65) Prior Publication Data

US 2021/0370883 A1 Dec. 2, 2021

(30) Foreign Application Priority Data

May 27, 2020 (JP) .............................. JP2020-092477

(51) Int. Cl.
| | | |
|---|---|---|
| *B60R 25/31* | (2013.01) | |
| *G06F 21/32* | (2013.01) | |
| *B60R 25/102* | (2013.01) | |
| *B60R 25/24* | (2013.01) | |
| *G06V 20/56* | (2022.01) | |
| *G06V 20/59* | (2022.01) | |

(Continued)

(52) U.S. Cl.
CPC ............ *B60R 25/31* (2013.01); *B60R 25/102* (2013.01); *B60R 25/24* (2013.01); *G06F 21/32* (2013.01); *G06V 20/56* (2022.01); *G06V 20/593* (2022.01); *G06V 40/166* (2022.01); *G06V 40/173* (2022.01); *G06V 40/50* (2022.01)

(58) Field of Classification Search
CPC ....... B60R 25/31; B60R 25/102; B60R 25/24; G06F 21/32; G06V 40/173; G06V 40/166; G06V 20/593; G06V 40/50; G06V 20/56
See application file for complete search history.

(56) References Cited

U.S. PATENT DOCUMENTS

| | | | |
|---|---|---|---|
| 2007/0014439 A1* | 1/2007 | Ando ...................... | G08B 31/00 382/118 |
| 2014/0280177 A1* | 9/2014 | Ishii ...................... | G06F 16/285 707/740 |
| 2017/0013188 A1* | 1/2017 | Kothari .................... | B60R 1/00 |

(Continued)

FOREIGN PATENT DOCUMENTS

JP 2003-138817 5/2003

*Primary Examiner* — Thomas D Alunkal
(74) *Attorney, Agent, or Firm* — Rankin, Hill & Clark LLP

(57) ABSTRACT

An entry support system includes: an externally located person reporting unit which executes predetermined reporting by a reporting unit used by an internal user when an externally located person is recognized by an externally located person recognition unit in a state where the internal user is recognized by an internal user recognition unit; and an entry permission unit which executes entry permission processing for enabling entry to a vehicle when a permission operation of the entry to the vehicle is performed to an operation unit used by the internal user after the predetermined reporting is executed.

9 Claims, 8 Drawing Sheets

(51) Int. Cl.
G06V 40/50 (2022.01)
G06V 40/16 (2022.01)

(56) References Cited

U.S. PATENT DOCUMENTS

| | | | |
|---|---|---|---|
| 2018/0118130 A1* | 5/2018 | Karabed | G06V 40/167 |
| 2019/0098185 A1* | 3/2019 | Kadomae | G03B 15/03 |
| 2020/0043344 A1* | 2/2020 | Shimizu | G08G 1/00 |

* cited by examiner

ENTRY SUPPORT SYSTEM, ENTRY SUPPORT METHOD, AND STORAGE MEDIUM

INCORPORATION BY REFERENCE

The present application claims priority under 35 U.S.C. § 119 to Japanese Patent Application No. 2020-092477 filed on May 27, 2020. The content of the application is incorporated herein by reference in its entirety.

BACKGROUND OF THE INVENTION

Field of the Invention

The present invention relates to an entry support system, an entry support method and a storage medium.

Description of the Related Art

Conventionally, an entry system which performs individual authentication of an object approaching a vehicle by a photographed image of vehicle surroundings by a camera and permits entry to the vehicle is known (for example, see Japanese Patent Laid-Open No. 2003-138817). The entry system identifies whether or not the object is a user according to coincidence between iris data of the object recognized from an image of the object approaching the vehicle and iris data of the user registered beforehand.

According to the entry system, when an externally located person who has approached a vehicle is identified as a user registered beforehand, entry to the vehicle by an external user is permitted. Therefore, when an internal user riding on the vehicle does not notice the externally located person, there is a risk that the externally located person who suddenly gets into the vehicle frightens the internal user.

The present invention is implemented in consideration of such a background, and an object is to provide an entry support system, an entry support method and a storage medium storing an entry support program capable of preventing an internal user riding on a vehicle from being frightened and supporting entry to the vehicle of an externally located person.

SUMMARY OF THE INVENTION

A first aspect for achieving the above-described object is an entry support system which supports entry of an externally located person to a vehicle, and the entry support system includes: an internal user recognition unit configured to recognize an internal user located in a vehicle interior of the vehicle; an externally located person recognition unit configured to recognize the externally located person located in an area around the vehicle; an externally located person reporting unit configured to execute predetermined reporting by a reporting unit used by the internal user when the externally located person is recognized by the externally located person recognition unit in a state where the internal user is recognized by the internal user recognition unit; and an entry permission unit configured to execute entry permission processing for enabling the entry to the vehicle when a permission operation of the entry to the vehicle is performed to an operation unit used by the internal user after the predetermined reporting is executed.

The above-described entry support system may be configured such that the entry support system includes an externally located person face image acquisition unit configured to acquire a face image of the externally located person, the reporting unit is a display unit visually recognized by the internal user, and the externally located person reporting unit executes processing of displaying the face image of the externally located person at the display unit as the predetermined reporting.

The above-described entry support system may be configured such that the entry support system includes a registered user authentication unit configured to determine whether or not the externally located person is a registered user for whom predetermined registration is performed, and the entry permission unit executes the entry permission processing after a lapse of predetermined time from a point of time at which the predetermined reporting is executed, when the externally located person is determined as the registered user by the registered user authentication unit.

The above-described entry support system may be configured such that the entry support system includes a registered user authentication unit configured to determine whether or not the externally located person is a registered user for whom predetermined registration is performed, and the externally located person reporting unit prohibits the predetermined reporting when a plurality of the externally located persons are recognized by the externally located person recognition unit and none of the externally located persons is determined as the registered user by the registered user authentication unit.

The above-described entry support system may be configured such that the entry support system includes a registered user authentication unit configured to determine whether or not the externally located person is a registered user for whom predetermined registration is performed, and the externally located person reporting unit executes the predetermined reporting of a first reporting aspect when the externally located person is determined as the registered user by the registered user authentication unit, and executes the predetermined reporting of a second reporting aspect different from the first reporting aspect when the externally located person is determined as not the registered user by the registered user authentication unit.

The above-described entry support system may be configured to include: a seat using state recognition unit configured to recognize a using state of seats of the vehicle; and a seat using state reporting unit configured to make a display unit visually recognized by the internal user display a seat using state screen that indicates a seat in use by a first display aspect and a vacant seat by a second display aspect different from the first display aspect, based on a recognition result of the using state of the seats of the vehicle by the seat using state recognition unit, when the externally located person is recognized by the externally located person recognition unit.

A second aspect for achieving the above-described object is an entry support method executed by a computer in order to support entry of an externally located person to a vehicle, and the entry support method includes: an internal user recognition step configured to recognize an internal user located in a vehicle interior of the vehicle; an externally located person recognition step configured to recognize the externally located person located in an area around the vehicle; an externally located person reporting step configured to execute predetermined reporting by a reporting unit used by the internal user when the externally located person is recognized by the externally located person recognition step in a state where the internal user is recognized by the internal user recognition step; and an entry permission step configured to execute entry permission processing for enabling the entry to the vehicle when a permission operation of the entry to the vehicle is performed to an operation unit used by the internal user after the predetermined reporting is executed.

A third aspect for achieving the above-described object is a non-transitory computer-readable storage medium storing an entry support program which is executed by a processor of an entry support system to support entry of an externally located person to a vehicle, wherein the entry support program makes the processor functions as: an internal user recognition unit configured to recognize an internal user located in a vehicle interior of the vehicle; an externally located person recognition unit configured to recognize the externally located person located in an area around the vehicle; an externally located person reporting unit configured to execute predetermined reporting by a reporting unit used by the internal user when the externally located person is recognized by the externally located person recognition unit in a state where the internal user is recognized by the internal user recognition unit; and an entry permission unit configured to execute entry permission processing for enabling the entry to the vehicle when a permission operation of the entry to the vehicle is performed to an operation unit used by the internal user after the predetermined reporting is executed.

According to the above-described entry support system, the predetermined reporting is performed by the externally located person reporting unit when an externally located person approaches a vehicle in a state where an internal user is riding on the vehicle, and the entry permission processing is executed by the entry permission unit when the internal user performs the permission operation of entry to the vehicle. Thus, in a case where the internal user does not notice the externally located person, the internal user is prevented from being frightened when the externally located person suddenly gets into the vehicle, and the entry to the vehicle by the externally located person can be supported.

DETAILED DESCRIPTION OF THE PREFERRED EMBODIMENTS

[1. Support Aspect of Entry to Vehicle by Entry Support System]

Figure 1:
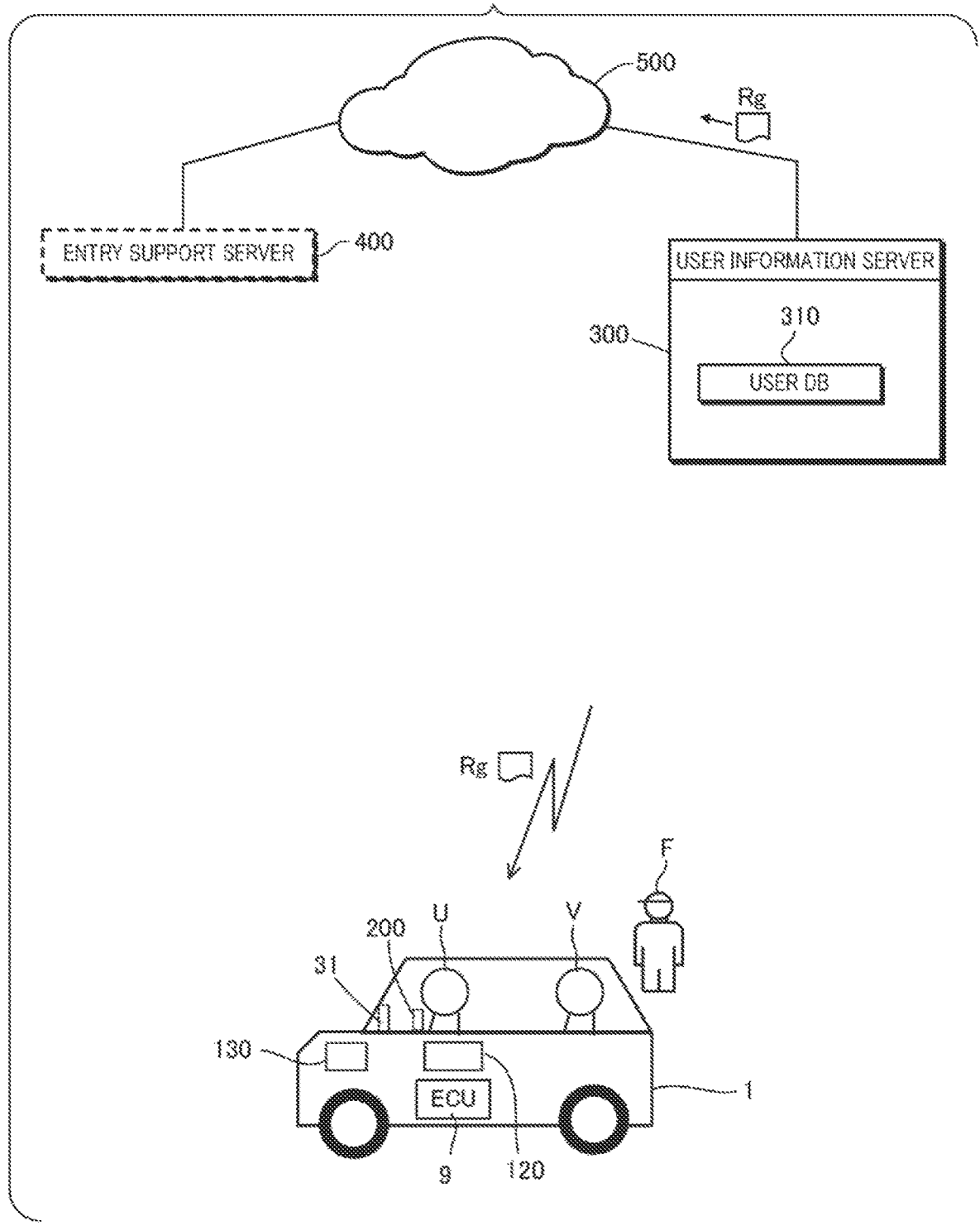
FIG. 1 is an explanatory drawing of a support aspect of entry to a vehicle by an entry support system.

With reference to FIG. 1, the support aspect of the entry to a vehicle 1 executed by an ECU (Electronic Control Unit) 9 loaded on the vehicle 1 will be explained. The ECU 9 includes a function of the entry support system of the present invention.

When an externally located person approaches the vehicle 1, the ECU 9 performs reporting to an internal user riding on the vehicle 1 and then supports the entry of the externally located person to the vehicle 1. FIG. 1 illustrates a situation where internal users U and V are riding on the parked vehicle 1, and an externally located person F is approaching the vehicle 1.

The vehicle 1 includes, other than the ECU 9, a touch panel 31, a communication unit 120 (receiver/transmitter) and a navigation device 130. The ECU 9 communicates with a user information server 300 including a processor, an antenna, and a user DB (Data Base) 310 via a communication network 500 by the communication unit 120. In addition, the ECU 9 communicates with a user terminal 200 (such as a smartphone or a cellular phone) used by the internal user U directly or via the communication network 500.

Note that, as to be described later, all or a part of the entry support system may be configured by an entry support server 400 which includes a processor and an antenna, and which communicates with the vehicle 1 via the communication network 500, or the user terminal 200. The communication 120 includes an antenna.

In the user DB 310, registered user information Rg which is information of a registered user for whom predetermined registration for utilizing the vehicle 1 is performed is recorded. The registered user information Rg includes identification information of the registered user. In the present embodiment, a face image of the registered user is used as the identification information of the registered user. The registered user is, for example, an owner of the vehicle 1 or a family member of the owner of the vehicle 1.

When the externally located person F located near the vehicle 1 is recognized from a photographed image of a vehicle exterior camera (details will be described later) which is provided on the vehicle 1 and photographs surroundings of the vehicle 1, the ECU 9 displays an externally located person reporting screen on the touch panel 31. The face image of the externally located person F is displayed on the externally located person reporting screen, and the internal user U can recognize that the externally located person F is approaching the vehicle 1 by visually recognizing an externally located person confirmation screen.

Then, the internal user U looks at the face image of the externally located person F, determines whether or not to permit the entry to the vehicle 1 to the externally located person F, and performs the entry permission operation by the touch panel 31 in the case of permitting the entry. The ECU 9 opens a power door (details will be described later) of the vehicle 1 according to the entry permission operation, and thus the externally located person F can get on the vehicle 1.

In addition, the ECU 9 determines whether or not the externally located person F is the registered user for whom utilization registration of the vehicle 1 is performed, based on the face image of the registered user included in the registered user information Rg acquired from the user DB 310 of the user information server 300. Then, when the externally located person F is the registered user, the ECU 9 displays specifying information (such as a name and a relation with the user U) of the registered user on the externally located person confirmation screen, and reports that the externally located person F is the registered user to the internal user U.

[2. Configuration of Vehicle]

Figure 2:
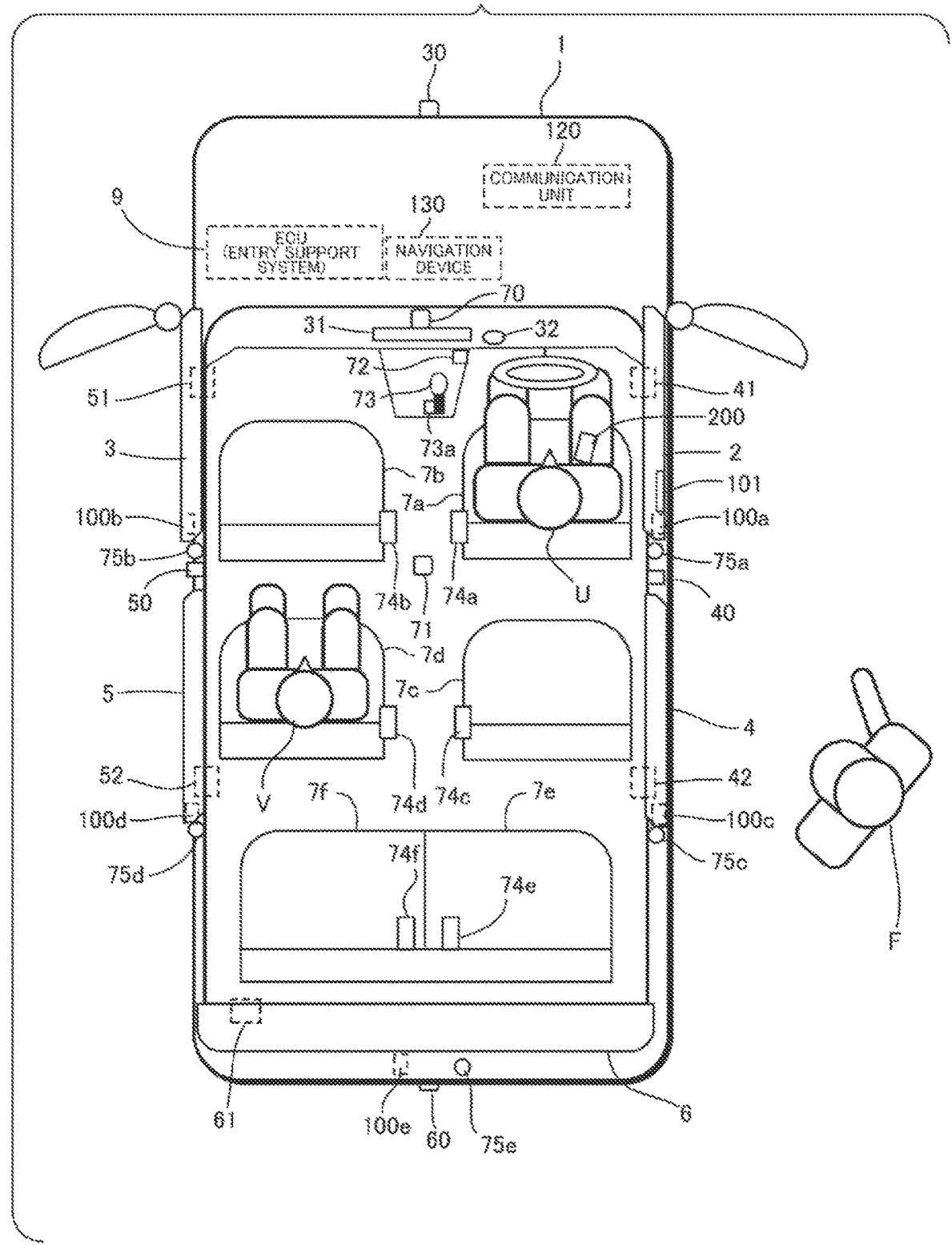
FIG. 2 is a block diagram of the vehicle loaded with the entry support system.

With reference to FIG. 2, the configuration of the vehicle 1 loaded with the ECU 9 including the function of the entry support system will be explained. The vehicle 1 is a passenger car with a riding capacity of six people, and includes a driver's seat 7a, a passenger seat 7b, a second row right seat 7c, a second row left seat 7d, a third row right seat 7e, and a third row left seat 7f. The individual seats 7a-7f are provided with seatbelt switches 74a-74f which detect whether or not non-illustrated seatbelts are worn. Hereinafter, the second row right seat 7c and the second row left seat 7d are also referred to as second row seats together, and the third row right seat 7e and the third row left seat 7f are also referred to as third row seats together. The internal user U is sitting in the driver's seat 7a, and the internal user V is sitting in the second row left seat 7d.

The vehicle 1 includes a right power hinge door 2, a left power hinge door 3, a right power slide door 4, a left power slide door 5, and a power tail gate 6. Hereinafter, the right power hinge door 2, the left power hinge door 3, the right power slide door 4 and the left power slide door 5 are also referred to as power doors. The right power slide door 4 and the left power slide door 5 are the power doors corresponding to the second row seats and the third row seats.

A door knob of the right power hinge door 2 is provided with a door touch sensor 101, and the internal user U or the like who has a portable key (not illustrated) of the vehicle 1 can unlock the doors 2-6 of the vehicle 1 by touching the door touch sensor 101.

The right power hinge door 2 includes a right PHD (Power Hinge Door) drive unit 41 which opens and closes the right power hinge door 2 by an electric actuator (not illustrated), and the left power hinge door 3 includes a left PHD drive unit 51 which opens and closes the left power hinge door 3 by the electric actuator. The right power slide door 4 includes a right PSD (Power Slide Door) drive unit 42 which opens and closes the right power slide door 4 by the electric actuator, and the left power slide door 5 includes a left PSD drive unit 52 which opens and closes the left power slide door 5 by the electric actuator. The power tail gate 6 includes a PTG (Power Tail Gate) drive unit 61 which opens and closes the power tail gate 6 by the electric actuator.

A front camera 30 which photographs front of the vehicle 1 is provided on a front part of the vehicle 1, and a rear camera 60 which photographs rear of the vehicle 1 is provided on a rear part of the vehicle 1. A right side camera 40 which photographs a right side of the vehicle 1 is provided on a right side part of the vehicle 1, and a left side camera 50 which photographs a left side of the vehicle 1 is provided on a left side part of the vehicle 1. The front camera 30, the right side camera 40, the left side camera 50 and the rear camera 60 are the vehicle exterior cameras that photograph the surroundings of the vehicle 1.

On a dashboard of the vehicle interior, a front seat camera 70 which photographs users sitting in the driver's seat 7a and the passenger seat 7b, a display device 31 and a speaker 32 are provided. On a ceiling of the vehicle interior, a rear seat camera 71 which photographs users sitting in the second row right seat 7c, the second row left seat 7d, the third row right seat 7e and the third row left seat 7f is provided.

The individual doors 2-5 are provided with door switches 75a-75d which detect opening/closing of the doors. The power tail gate 6 is also provided with a door switch 75e which detects the opening/closing of the power tail gate 6. Further, near the driver's seat 7a, a power switch 72 for instructing on/off of power of the vehicle 1, and a shift switch 73a which detects a shift position of a shift lever 73 are provided.

Further, the vehicle 1 includes door lock mechanisms 100a-100e which lock the individual doors 2-5 and the power tail gate 6, the communication unit 120 which communicates with the user terminal 200 and the user information server 300 or the like, and the navigation device 130. The navigation device 130 has a non-illustrated processor, GPS (Global Positioning System) sensor, memory, and map data, and executes route guidance, by a function of the processor, to a destination or the like based on a position of the predetermined vehicle 1 detected by the GPS sensor and the map data.

[3. Configuration of Entry Support System]

Figure 3:
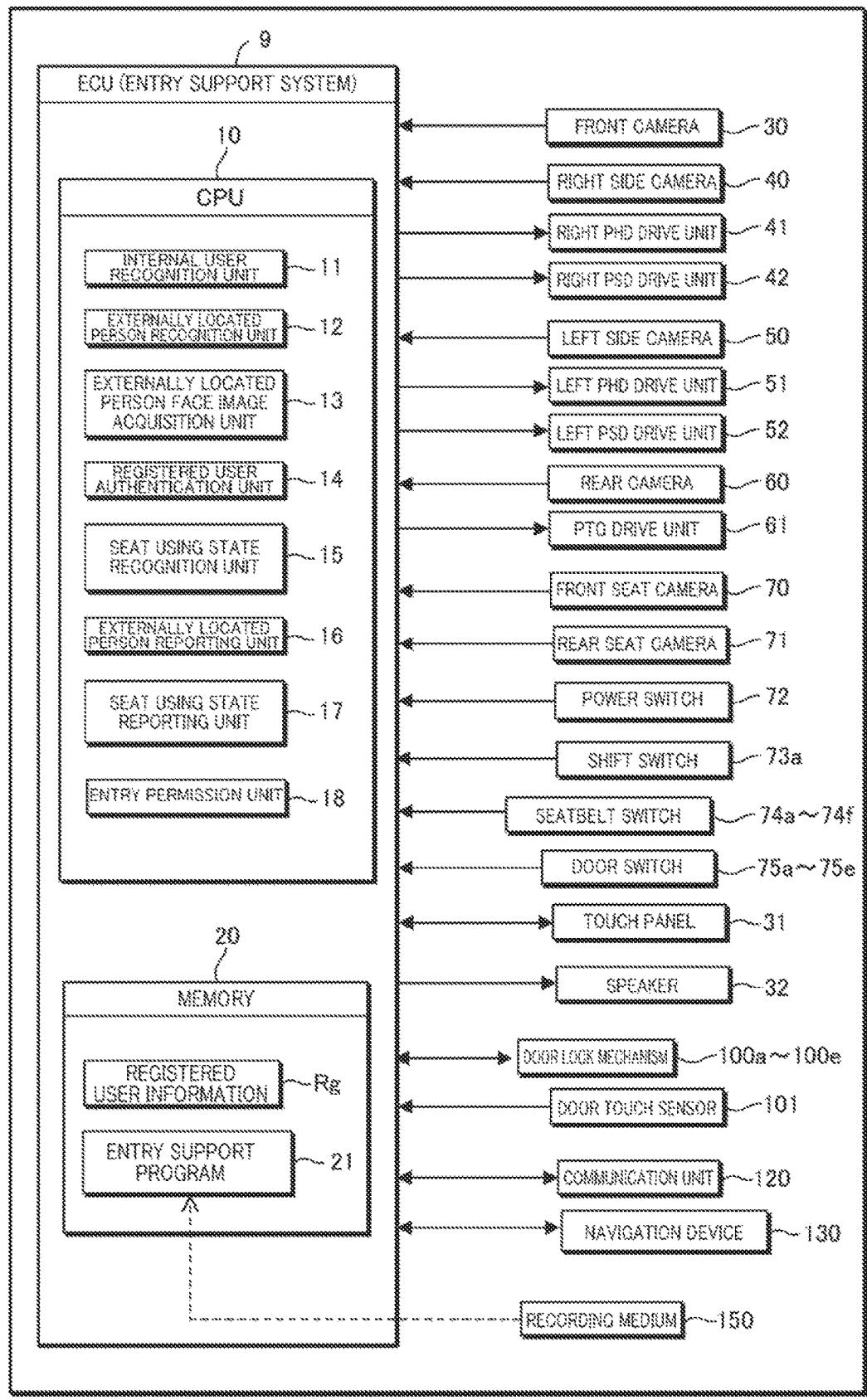
FIG. 3 is a block diagram of the entry support system.

With reference to FIG. 3, the entry support system configured as the function of the ECU 9 will be explained. The ECU 9 is configured by a CPU (Central Processing Unit) 10, a memory 20 and a non-illustrated interface circuit or the like, and controls an operation of the vehicle 1. The CPU 10 corresponds to a computer of the present invention. In the memory 20, the registered user information Rg and an entry support program 21 are preserved.

The registered user information Rg is acquired from the user DB 310 as described above with reference to FIG. 1. The registered user information Rg includes the face image of the registered user which is the identification information of the registered user. Note that the registered user information Rg may be transmitted to the ECU 9 from a communication terminal used by the registered user, or may be read to the ECU 9 from a recording medium such as a memory card in which the registered user information Rg is recorded.

The entry support program 21 may be read from a recording medium 150 (such as an optical disk or a flash memory) and preserved in the memory 20 by the ECU 9. In addition, the entry support program 21 may be downloaded from a non-illustrated external server via the communication network 500 and preserved in the memory 20 by the ECU 9.

To the ECU 9, images of the surroundings of the vehicle 1 photographed by the front camera 30, the right side camera 40, the left side camera 50 and the rear camera 60 are inputted. In addition, to the ECU 9, the images inside the vehicle interior photographed by the front seat camera 70 and the rear seat camera 71 are inputted.

Further, to the ECU 9, detection signals of the power switch 72, the shift switch 73a, the seatbelt switches 74a-74f and the door switches 75a-75e, and lock detection signals of the individual doors 2-5 and the power tail gate 6 by door lock sensors (not illustrated) provided in the door lock mechanisms 100a-100e are inputted. In addition, to the ECU 9, an operation signal of the touch panel 31, a touch detection signal by the door touch sensor 101, and information on a current position of the vehicle 1 detected by the navigation device 130 are inputted.

By a control signal outputted from the ECU 9, the operations of the right PHD drive unit 41, the right PSD drive unit 42, the left PHD drive unit 51, the left PSD drive unit 52, the PTG drive unit 61 and the door lock mechanisms 100a-100e are controlled. In addition, by the control signal outputted from the ECU 9, screen display of the touch panel 31 and sound (such as voice guidance or chime sound) outputted from the speaker 32 are controlled. The ECU 9 communicates with the user terminal 200, the user information server 300 and the entry support server 400 illustrated in FIG. 1 (see FIG. 1) or the like via the communication unit 120.

By reading and executing the entry support program 21 preserved in the memory 20, the CPU 10 functions as an internal user recognition unit 11, an externally located person recognition unit 12, an externally located person face image acquisition unit 13, a registered user authentication unit 14, a seat using state recognition unit 15, an externally located person reporting unit 16, a seat using state reporting unit 17, and an entry permission unit 18.

The processing executed by the internal user recognition unit 11 corresponds to an internal user recognition step of the present invention, and the processing executed by the externally located person recognition unit 12 corresponds to an externally located person recognition step of the present invention. The processing executed by the externally located person reporting unit 16 corresponds to an externally located person reporting step of the present invention, and the processing executed by the entry permission unit 18 corresponds to an entry permission step of the present invention.

The internal user recognition unit 11 recognizes the internal user located inside the interior of the vehicle 1 by extracting an image portion having a feature of a person from the photographed images by the front seat camera 70 and the rear seat camera 71. The externally located person recognition unit 12 recognizes the externally located person located near the vehicle 1 by extracting an image portion having a feature of a person from the images of the surroundings of the vehicle 1 photographed by the front camera 30, the right side camera 40, the left side camera 50 and the rear camera 60.

The externally located person face image acquisition unit 13 extracts and acquires the face image of the externally located person recognized by the externally located person recognition unit 12 from the photographed image by the front camera 30, the right side camera 40, the left side camera 50 or the rear camera 60. The registered user authentication unit 14 determines whether or not the external user is the registered user, based on the face image the registered user recorded in the registered user information Rg. The registered user authentication unit 14 determines the externally located person as the registered user when a matching degree between the face image of the externally located person acquired by the externally located person face image acquisition unit 13 and the face image of the registered user is a predetermined determination value or greater.

The seat using state recognition unit 15 recognizes a using state of the individual seats (the driver's seat 7a, the passenger seat 7b, the second row right seat 7c, the second row left seat 7d, the third row right seat 7e, and the third row left seat 7f) of the vehicle 1 from the photographed images by the front seat camera 70 and the rear seat camera 71. Note that the using state of the individual seats may be recognized by detecting presence/absence of use of seatbelts of the individual seats by the seatbelt switches 75a-75e, or by seating sensors (not illustrated) such as pressure sensors provided on the individual seats.

Figure 7:
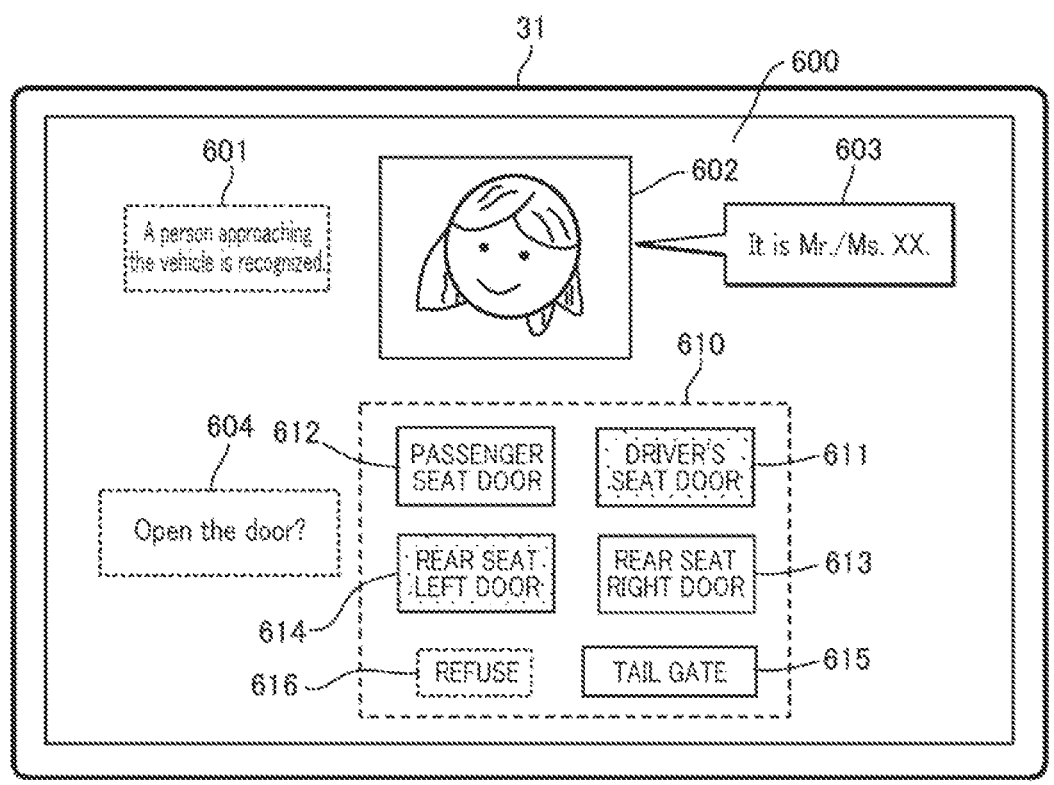
FIG. 7 is an explanatory drawing of a first display example of an externally located person reporting screen.

When the externally located person is recognized by the externally located person recognition unit 12 in the state where the internal user is recognized by the internal user recognition unit 11, the externally located person reporting unit 16 displays an externally located person reporting screen 600 illustrated in FIG. 7 on the touch panel 31. On the externally located person reporting screen 600, recognition reporting display 601 which reports that the externally located person is recognized, a face image 602 of the externally located person, and specifying display 603 of the registered user displayed in the case where the externally located person is the registered user. The specifying display 603 displays a name of the registered user and a relation (a family member, a friend or an acquaintance or the like) with the internal user U.

The seat using state reporting unit 17 displays seat using state display 610 on the externally located person reporting screen 600. The seat using state display 610 includes a driver's seat door button 611, a passenger seat door button 612, a rear seat right door button 613, a rear seat left door button 614, a tail gate button 615, and a refuse button 616.

The driver's seat door button 611 is an opening instruction button for the right power hinge door 2, and also indicates the using state of the driver's seat 7a recognized by the seat using state recognition unit 15 by presence/absence of half-tone dot meshing. That is, the seat using state reporting unit 17 displays the driver's seat door button 611 with the half-tone dot meshing (corresponding to a second display aspect of the present invention) when the driver's seat 7a is in use, and displays the driver's seat door button 611 without the half-tone dot meshing (corresponding to the first aspect of the present invention) when the driver's seat 7a is vacant. Note that the using state of the driver's seat 7a may be indicated by an aspect other than the presence/absence of the half-tone dot meshing, and may be indicated by a difference of colors, difference of sizes or the presence/absence of flashing, for example.

Similarly, the passenger seat door button 612 is the opening instruction button for the left power hinge door 3, and also reports the using state of the passenger seat 7b by the presence/absence of the half-tone dot meshing. Similarly, the rear seat right door button 613 is the opening instruction button for the right power slide door 4, and also reports the using state of the second row right seat 7c by the presence/absence of the half-tone dot meshing of the rear seat right door button 613. Similarly, the rear seat left door button 614 is the opening instruction button for the left power slide door 5, and also reports the using state of the second row left seat 7d by the presence/absence of the half-tone dot meshing of the rear seat left door button 614.

Note that reporting of the using state of the seats by the individual door buttons 611-614 may be performed by an aspect other than the presence/absence of the half-tone dot meshing, and the using state of the seats may be reported by the difference of colors, the difference of sizes or the presence/absence of flashing, for example.

The internal user U can easily recognize the using state of the corresponding seat by the presence/absence of the half-tone dot meshing of the individual door buttons 611-614. The internal user U can select the power door to be opened for the external user, and instruct an opening operation of the selected door by touching the door button corresponding to the selected door.

In addition, the internal user U can instruct the opening operation of the power tail gate 6 by touching the tail gate button 615. Further, the internal user U can instruct to close an open power door and close the externally located person reporting screen 600 by operating the refuse button 616.

The entry permission unit 18 executes the processing (corresponding to entry permission processing) of opening the corresponding power door according to a touch operation of the individual door buttons 611-615 on the externally located person reporting screen 600.

Figure 8:
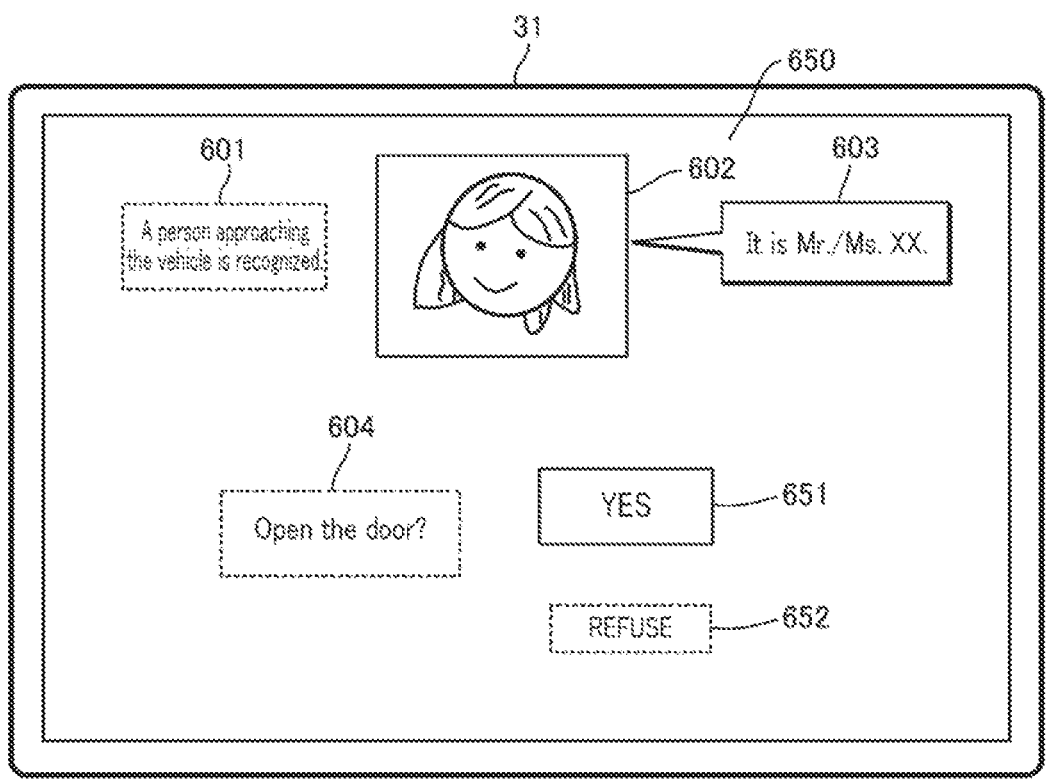
FIG. 8 is an explanatory drawing of a second display example of the externally located person reporting screen.

Note that, as illustrated in FIG. 8, an externally located person reporting screen 650 not displaying the seat using state display 610 may be displayed on the touch panel 31. In this case, on the externally located person reporting screen 650, an opening instruction button 651 and a refuse button 652 are displayed. Then, the entry permission unit 18 opens a preset power door (the left power hinge door 3, for example) when the opening instruction button 651 is touched. Note that the entry permission unit 18 may open the power door corresponding to a vacant seat according to the using state of the individual seats recognized by the seat using state recognition unit 15. For example, the entry permission unit 18 may open the right power hinge door 2 in the case where the second row right seat 7c is vacant.

[4. Entry Support Processing]

With reference to FIGS. 1 to 3, the entry support processing for the vehicle 1 executed by the function of the ECU 9 as the entry support system will be explained according to flowcharts illustrated in FIGS. 4 to 6.

Figure 4:
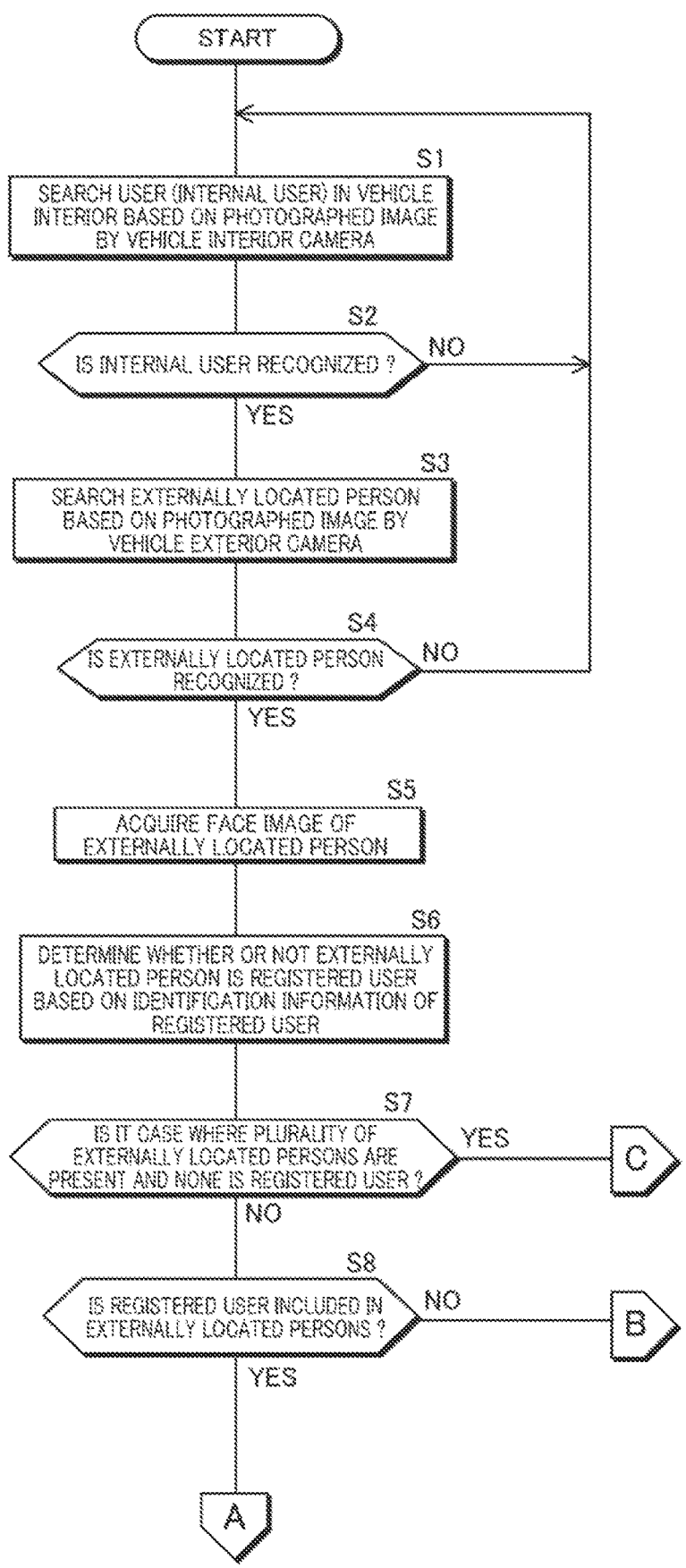
FIG. 4 is a first flowchart of entry support processing.

In step S1 in FIG. 4, the internal user recognition unit 11 searches a user (internal user) inside the vehicle interior of the vehicle 1 based on the photographed images by vehicle interior cameras (the front seat camera 70 and the rear seat camera 71). In following step S2, the internal user recognition unit 11 advances the processing to step S3 when the internal user is recognized, and advances the processing to step S1 when the internal user is not recognized. In the example of FIG. 1 and FIG. 3, the internal users U and V are recognized.

In next step S3, the externally located person recognition unit 12 searches the externally located person located near the vehicle 1, based on the photographed images by the exterior cameras (the front camera 30, the right side camera 40, the left side camera 50 and the rear camera 60). In following step S4, the externally located person recognition unit 12 advances the processing to step S5 when the externally located person is recognized, and advances the processing to step S1 when the externally located person is not recognized.

In step S5, the externally located person face image acquisition unit 13 extracts the face image of the externally located person from the photographed images by the exterior cameras, and acquire the face image of the externally located person. In following step S6, the registered user authentication unit 14 determines whether or not the externally located person is the registered user, based on the matching degree between the face image of the registered user recorded in the registered user information Rg and the face image of the externally located person acquired by the externally located person face image acquisition unit 13. When a plurality of externally located persons are recognized, the registered user authentication unit 14 determines whether or not each externally located person is the registered user.

Figure 5:
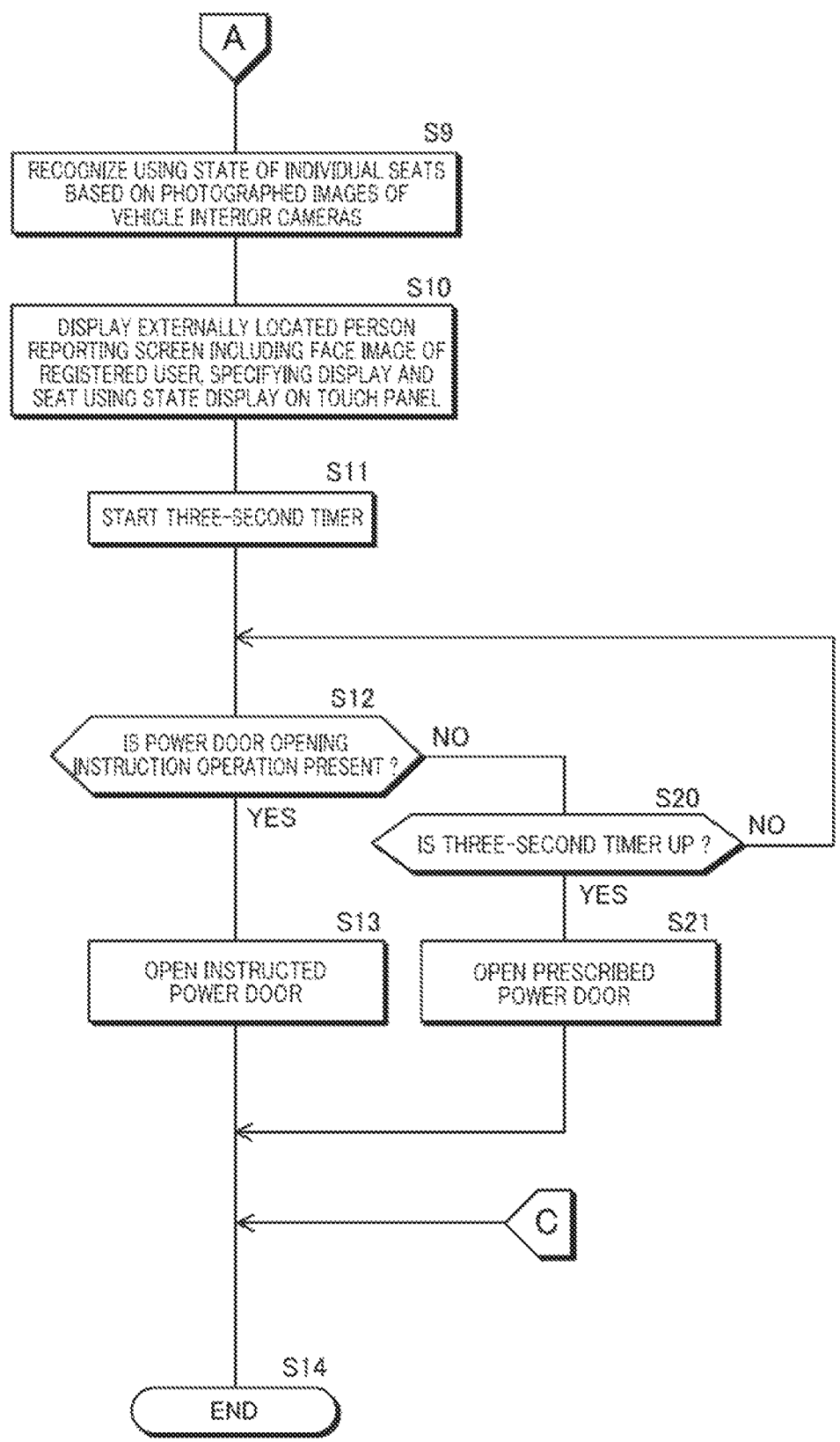
FIG. 5 is a second flowchart of the entry support processing.

In next step S7, when a plurality of externally located persons are present and none is the registered user, the registered user authentication unit 14 advances the processing to step S14 in FIG. 5. In this case, display of the externally located person reporting screen by step S10 or step S31 to be described later is not performed. Thus, when many pedestrians are passing through near the vehicle 1, the internal user can be prevented from feeling troublesome due to frequent display of the externally located person reporting screen on the touch panel 31.

On the other hand, when one externally located person is present or a plurality of externally located persons are present and the registered user is included, the registered user authentication unit 14 advances the processing to step S8. In step S8, the registered user authentication unit 14 advances the processing to step S9 in FIG. 5 when the registered user is included in the externally located persons, and advances the processing to step S30 in FIG. 6 when the registered user is not included in the externally located persons. In step S9 in FIG. 5, the seat using state recognition unit 15 recognizes the using state of the individual seats of the vehicle 1 based on the photographed images by the vehicle interior cameras.

In following step S10, the externally located person reporting unit 16 and the seat using state reporting unit 17 display the externally located person reporting screen 600 in the aspect (corresponding to a first reporting aspect of the present invention) including the specifying display 603 described above with reference to FIG. 7 on the touch panel 31. In following step S11, the entry permission unit 18 starts a three-second timer. A period of three seconds corresponds to predetermined time of the present invention. The period of three seconds is a setting example of the predetermined time, and the predetermined time is set in a range of 1-5 seconds for example.

In a loop of following step S12 and S20, the entry permission unit 18 advances the processing from step S12 to step S13 when one of the door buttons 611-614 is operated on the seat using state display 610 on the externally located person reporting screen 600. Then, the entry permission unit 18 opens the power door instructed to be opened by one of the door buttons 611-614 in step S13.

In addition, when the three-second timer is up without the door buttons 611-614 being operated, the entry permission unit 18 advances the processing from step S20 to step S21. In step S21, the entry permission unit 18 opens a prescribed power door (the left power hinge door 3, for example). Thus, in the case where the registered user is included in the externally located person, even when the internal user U does not operate the door buttons 611-614, the power door is opened and the registered user can get on the vehicle 1.

Figure 6:
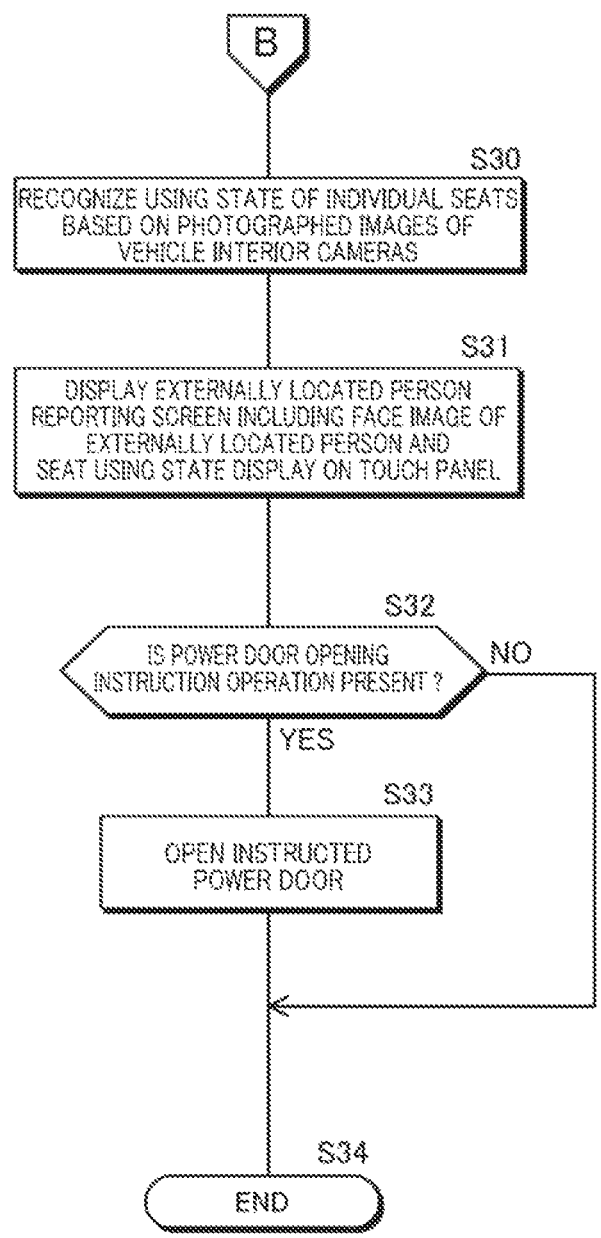
FIG. 6 is a third flowchart of the entry support processing.

In addition, in step S30 in FIG. 6, the seat using state recognition unit 15 recognizes the using state of the individual seats of the vehicle 1, based on the photographed images by the vehicle interior cameras. In following step S31, the externally located person reporting unit 16 and the seat using state reporting unit 17 displays the externally located person reporting screen 600 described above with reference to FIG. 7 on the touch panel 31 in the aspect (corresponding to a second reporting aspect of the present invention) of omitting the specifying display 603.

In following step S32, when one of the door buttons 611-614 is operated, the entry permission unit 18 advances the processing to step S33 and opens the power door instructed to be opened. On the other hand, when none of the door buttons 611-613 is operated, the entry permission unit 18 advances the processing to step S34, and the opening operation of the power door is not executed in this case.

[5. Other Embodiments]

In the embodiment described above, the externally located person reporting unit 16 performs the processing of displaying the externally located person reporting screen including the face image of the externally located person on the touch panel 31 as predetermined reporting in the case where the externally located person is recognized. As another embodiment, the predetermined reporting by another aspect of outputting a feature of the externally located person by sound or the like may be performed.

In the embodiment described above, the registered user authentication unit 14 is provided and the aspect of the predetermined reporting when the externally located person is recognized is changed depending on whether or not the externally located person is the registered user, however, the registered user authentication unit 14 may be omitted.

In the embodiment described above, the entry permission unit 18 performs the processing of opening the power door after the lapse of the predetermined time without the door buttons 611-613 being operated when the externally located person is the registered user by steps S11, S20 and S21 in FIG. 5, however, the processing may not be performed.

In the embodiment described above, the seat using state recognition unit 15 and the seat using state reporting unit 17 are provided and the seat using state display indicating the using state of the individual seats is displayed on the externally located person reporting screen 600, however, the seat using state recognition unit 15 and the seat using state reporting unit 17 may be omitted.

In the embodiment described above, the entry support system of the present invention is configured by the ECU 9 loaded on the vehicle 1. As another embodiment, the entry support system may be configured by the entry support server 400 illustrated in FIG. 1. In this case, from the vehicle 1 to the entry support server 400, the photographed images of the vehicle interior cameras (the front seat camera 70 and the rear seat camera 71) and the vehicle exterior cameras (the front camera 30, the right side camera 40, the left side camera 50 and the rear camera 60) and operation information of the touch panel 31 are transmitted. In addition, from the entry support server 400 to the vehicle 1, control information which displays the externally located person reporting screen 600 on the touch panel 31 and control information which opens the power door of the vehicle 1 are transmitted.

Further, a part of the configuration of the entry support system may be configured by the ECU 9 of the vehicle 1, and the remaining configuration of the entry support system may be configured by the entry support server 400. In this case, the entry support system is configured by the ECU 9 and the entry support server.

In addition, the entry support system of the present invention may be configured by an application of the user terminal 200. In this case, the entry support method of the present invention is executed by a CPU (not illustrated) of the user terminal 200. Then, the photographed images of the vehicle exterior cameras and the vehicle interior cameras are transmitted from the vehicle 1 to the user terminal 200, and the control information which displays the externally located person reporting screen 600 on the touch panel 31 and the control information which opens the power door of the vehicle 1 are transmitted from the user terminal 200 to the vehicle 1.

Further, a part of the configuration of the entry support system may be configured by the application of the user terminal 200, and the remaining configuration of the entry support system may be configured by the ECU 9 or the entry support server 400. In this case, the entry support system is configured by the user terminal 200 and the ECU 9, or by the user terminal 200, the ECU 9 and the entry support server 400.

In the embodiment described above, the entry permission unit 18 performs the processing of opening the power door of the vehicle 1 as the entry permission processing for enabling the entry to the vehicle 1, however, the processing of unlocking the power door may be performed as the entry permission processing. In addition, the processing of unlocking a door may be performed as the entry permission processing for a vehicle not provided with the power door.

In the embodiment described above, the face image of the registered user is used as the identification information of the registered user, however, other biological information of an iris, a voiceprint or the like may be used as the identification information. Or, an identification code transmitted from a portable terminal carried by the registered user may be used as the identification information.

Note that FIGS. 1 to 3 are schematic diagrams illustrating the configuration of the vehicle 1 and the ECU 9 including the function of the entry support system in divisions depending on main processing content to facilitate understanding of the present invention, but the configuration of the vehicle 1 and the entry support system may be configured by other divisions. In addition, the processing of each component may be executed by one hardware unit, or may be executed by a plurality of hardware units. Further, the processing by each component illustrated in FIGS. 4 to 6 may be executed by one program, or may be executed by a plurality of programs.

[6. Configuration Supported by Embodiment Described Above]

The embodiment described above is a specific example of the configuration below.

(Clause 1) An entry support system which supports entry of an externally located person to a vehicle, the entry support system including: an internal user recognition unit configured to recognize an internal user located in a vehicle interior of the vehicle; an externally located person recognition unit configured to recognize the externally located person located in an area around the vehicle; an externally located person reporting unit configured to execute predetermined reporting by a reporting unit used by the internal user when the externally located person is recognized by the externally located person recognition unit in a state where the internal user is recognized by the internal user recognition unit; and an entry permission unit configured to execute entry permission processing for enabling the entry to the vehicle when a permission operation of the entry to the vehicle is performed to an operation unit used by the internal user after the predetermined reporting is executed.

According to the entry support system of Clause 1, the predetermined reporting is performed by the externally located person reporting unit when an externally located person approaches a vehicle in a state where an internal user is riding on the vehicle, and the entry permission processing is executed by the entry permission unit when the internal user performs the permission operation of entry to the vehicle. Thus, in a case where the internal user does not notice the externally located person, the internal user is prevented from being frightened when the externally located person suddenly gets into the vehicle, and the entry to the vehicle by the externally located person can be supported.

(Clause 2) The entry support system according to Clause 1, including the externally located person face image acquisition unit configured to acquire a face image of the externally located person, wherein the reporting unit is a display unit visually recognized by the internal user, and the externally located person reporting unit executes processing of displaying the face image of the externally located person at the display unit as the predetermined reporting.

According to the entry support system of Clause 2, by displaying the face image of the externally located person at the display unit, identification of the externally located person by the internal user is made possible and the internal user can be urged to determine whether or not to permit the entry to the vehicle.

(Clause 3) The entry support system according to Clause 1 or Clause 2, including a registered user authentication unit configured to determine whether or not the externally located person is a registered user for whom predetermined registration is performed, wherein the entry permission unit executes the entry permission processing after a lapse of predetermined time from a point of time at which the predetermined reporting is executed, when the externally located person is determined as the registered user by the registered user authentication unit.

According to the entry support system of Clause 3, in the case where the externally located person is the registered user, the internal user can permit the entry to the vehicle after noticing an approach of the externally located person by the predetermined reporting.

(Clause 4) The entry support system according to Clause 1 or Clause 2, including a registered user authentication unit configured to determine whether or not the externally located person is a registered user for whom predetermined registration is performed, wherein the externally located person reporting unit prohibits the predetermined reporting when a plurality of externally located persons are recognized by the externally located person recognition unit and none of the externally located persons is determined as the registered user by the registered user authentication unit.

According to the entry support system of Clause 4, when the vehicle is parked in a place with heavy traffic of pedestrians such as a busy quarter and many externally located persons are passing through around the vehicle, the internal user can be prevented from feeling troublesome due to frequent execution of the predetermined reporting.

(Clause 5) The entry support system according to Clause 1 or Clause 2, including a registered user authentication unit configured to determine whether or not the externally located person is a registered user for whom predetermined registration is performed, wherein the externally located person reporting unit executes the predetermined reporting of a first reporting aspect when the externally located person is determined as the registered user by the registered user authentication unit, and executes the predetermined reporting of a second reporting aspect different from the first reporting aspect when the externally located person is determined as not the registered user by the registered user authentication unit.

According to the entry support system of Clause 5, the internal user can easily recognize whether or not the externally located person is the registered user by the difference of the reporting aspect of the predetermined reporting.

(Clause 6) The entry support system according to any one of Clauses 1 to 5, including: a seat using state recognition unit configured to recognize a using state of seats of the vehicle; and a seat using state reporting unit configured to make a display unit visually recognized by the internal user display a seat using state screen that indicates a seat in use by a first display aspect and a vacant seat by a second display aspect different from the first display aspect, based on a recognition result of the using state of the seats of the vehicle by the seat using state recognition unit, when the externally located person is recognized by the externally located person recognition unit.

According to the entry support system of Clause 6, the internal user can easily confirm the using state of the individual seats and decide whether or not to permit the entry for which door of the vehicle by visually recognizing the seat using state screen.

(Clause 7) An entry support method executed by a computer in order to support entry of an externally located person to a vehicle, the entry support method including: an internal user recognition step configured to recognize an internal user located in a vehicle interior of the vehicle; an externally located person recognition step configured to recognize the externally located person located in an area around the vehicle; an externally located person reporting step configured to execute predetermined reporting by a reporting unit used by the internal user when the externally located person is recognized by the externally located person recognition step in a state where the internal user is recognized by the internal user recognition step; and an entry permission step configured to execute entry permission processing for enabling the entry to the vehicle when a permission operation of the entry to the vehicle is performed to an operation unit used by the internal user after the predetermined reporting is executed.

By executing the entry support method of Clause 7 by the computer, an operation effect similar to that of the entry support system of Clause 1 can be obtained.

(Clause 8) A non-transitory computer-readable storage medium storing an entry support program which is executed by a processor of an entry support system to support entry of an externally located person to a vehicle, wherein the entry support program makes the processor functions as: an internal user recognition unit configured to recognize an internal user located in a vehicle interior of the vehicle; an externally located person recognition unit configured to recognize the externally located person located in an area around the vehicle; an externally located person reporting unit configured to execute predetermined reporting by a reporting unit used by the internal user when the externally located person is recognized by the externally located person recognition unit in a state where the internal user is recognized by the internal user recognition unit; and an entry permission unit configured to execute entry permission processing for enabling the entry to the vehicle when a permission operation of the entry to the vehicle is performed to an operation unit used by the internal user after the predetermined reporting is executed.

By executing the entry support program of Clause 8 as a function of the processor by the computer, the configuration of the entry support system of Clause 1 can be achieved.

REFERENCE SIGNS LIST

1 ... vehicle, 2 ... right power hinge door, 3 ... left power hinge door, 4 ... right power slide door, 5 ... left power slide door, 6 ... power tail gate, 9 ... ECU (entry support system), 10 ... CPU, 11 ... internal user recognition unit, 12 ... externally located person recognition unit, 13 ... externally located person face image acquisition unit, 14 ... registered user authentication unit 14, 15 ... seat using state recognition unit, 16 ... externally located person reporting unit, 17 ... seat using state reporting unit, 18 ... entry permission unit, 20 ... memory, 21 ... entry support program, 30 ... front camera, 31 ... touch panel, 32 ... speaker, 40 ... right side camera, 50 ... left side camera, 60 ... rear camera, 70 ... front seat camera, 71 ... rear seat camera, 150 ... recording medium, 300 ... user information server, 400 ... entry support server, 500 ... communication network, U,V ... internal user, F ... externally located person, Rg ... registered user information.

What is claimed is:

1. An entry support system which supports entry of an externally located person to a vehicle, the entry support system comprising a processor, wherein the processor:
   recognizes an internal user located in a vehicle interior of the vehicle;
   recognizes the externally located person located in an area around the vehicle;
   executes predetermined reporting by a reporting unit used by the internal user when the externally located person is recognized in a state where the internal user is recognized;

executes an entry permission processing for enabling the entry to the vehicle when a permission operation of the entry to the vehicle is performed by the internal user after the predetermined reporting is executed;

determines whether or not the externally located person is a registered user for whom predetermined registration is performed and stored in a memory of the vehicle; and executes the entry permission processing after a lapse of predetermined time from a point of time at which the predetermined reporting is executed, when the externally located person is determined as the registered user.

2. The entry support system according to claim 1, wherein the processor:

acquires a face image of the externally located person from a camera that is provided on the vehicle and photographs a surrounding of the vehicle, and executes processing of displaying the face image of the externally located person at a touch panel display.

3. The entry support system according to claim 1, wherein the processor:

determines whether or not the externally located person is the registered user for whom predetermined registration is performed, and prohibits the predetermined reporting when a plurality of the externally located persons are recognized and none of the externally located persons are determined as the registered user.

4. The entry support system according to claim 1, wherein the processor:

determines whether or not the externally located person is the registered user for whom predetermined registration is performed, and executes the predetermined reporting of a first reporting aspect when the externally located person is determined as the registered user, and executes the predetermined reporting of a second reporting aspect different from the first reporting aspect when the externally located person is determined as not the registered user.

5. The entry support system according to claim 1, wherein the processor:

recognizes a using state of seats of the vehicle;

when the externally located person is recognized in a state where the internal user is recognized, makes a touch panel display visually recognized by the internal user display a recognition report which reports that the externally located person is recognized and a seat using state display based on a recognition result of the using state of seats of the vehicle, wherein the seat using state display includes a driver's seat door button that is an opening instruction button for a driver's seat door, a passenger seat door button that is an opening instruction button for a passenger seat door, a rear seat right door button that is an opening instruction button for a rear seat right door, and a rear seat left door button that is an opening instruction button for a rear seat left door, the driver's seat door button, the passenger seat door button, the rear seat right door button, and the rear seat left door button indicate the seat using state of the driver's seat, the passenger seat, the rear right seat, and the rear left seat, respectively, and the seat using state display indicates a door button corresponding to a vacant seat by a first display aspect and a door button corresponding to a seat in use by a second display aspect different from the first display aspect.

6. An entry support method executed by a computer in order to support entry of an externally located person to a vehicle, the entry support method comprising:

an internal user recognition step configured to recognize an internal user located in a vehicle interior of the vehicle;

an externally located person recognition step configured to recognize the externally located person located in an area around the vehicle;

an externally located person reporting step configured to execute predetermined reporting by a touch panel display used by the internal user when the externally located person is recognized by the externally located person recognition step in a state where the internal user is recognized by the internal user recognition step;

an entry permission step configured to execute entry permission processing for enabling the entry to the vehicle when a permission operation of the entry to the vehicle is performed to the touch panel display used by the internal user after the predetermined reporting is executed; and a registered user authentication step configured to determine whether or not the externally located person is a registered user for whom predetermined registration is performed and stored in a memory of the vehicle, wherein the entry permission step is configured to execute the entry permission processing after a lapse of predetermined time from a point of time at which the predetermined reporting is executed, when the externally located person is determined as the registered user.

7. A non-transitory computer-readable storage medium storing an entry support program which is executed by a processor of an entry support system to support entry of an externally located person to a vehicle, wherein the entry support program makes the processor:

recognize an internal user located in a vehicle interior of the vehicle;

recognize the externally located person located in an area around the vehicle;

execute predetermined reporting used by the internal user when the externally located person is recognized in a state where the internal user is recognized;

execute an entry permission processing for enabling the entry to the vehicle when a permission operation of the entry to the vehicle is performed by the internal user after the predetermined reporting is executed; and determine whether or not the externally located person is a registered user for whom predetermined registration is performed and stored in a memory of the vehicle, wherein the entry support program makes the processor execute the entry permission processing after a lapse of predetermined time from a point of time at which the predetermined reporting is executed, when the externally located person is determined as the registered user.

8. The entry support system according to claim 1, wherein the processor, when the externally located person is determined as the registered user, executes the entry permission processing even when the permission operation of the entry to the vehicle is not performed.

9. The entry support system according to claim 1, wherein the processor displays a specifying display showing a relation with the internal user when the externally located person is recognized in the state where the internal user is recognized and where the externally located person is the registered user.

* * * * *